United States Patent
Cook et al.

(10) Patent No.: US 11,959,019 B2
(45) Date of Patent: Apr. 16, 2024

(54) ANHYDROUS AMMONIA STIMULATION PROCESS

(71) Applicant: HRB Stimulation, LLC, Oklahoma City, OK (US)

(72) Inventors: Holden Cook, Oklahoma City, OK (US); Ron Hammond, Oklahoma City, OK (US); Brent Cook, Oklahoma City, OK (US)

(73) Assignee: HRB Stimulation, LLC, Oklahoma City, OK (US)

(*) Notice: Subject to any disclaimer, the term of this patent is extended or adjusted under 35 U.S.C. 154(b) by 0 days.

(21) Appl. No.: 18/330,873

(22) Filed: Jun. 7, 2023

(65) Prior Publication Data
US 2024/0034924 A1   Feb. 1, 2024

Related U.S. Application Data

(60) Provisional application No. 63/370,059, filed on Aug. 1, 2022.

(51) Int. Cl.
 *C09K 8/64* (2006.01)
 *C09K 8/66* (2006.01)

(52) U.S. Cl.
 CPC ........... *C09K 8/665* (2013.01); *C09K 8/64* (2013.01)

(58) Field of Classification Search
 CPC .... E21B 43/26; E21B 43/255; E21B 43/2605; E21B 43/2607; E21B 43/27; C09K 8/64; C09K 8/665; C09K 8/62; C09K 8/70; C09K 8/60; C09K 8/82; C09K 8/601
 USPC .......... 166/308.1, 308.2, 308.3, 308.4, 308.5
 See application file for complete search history.

(56) References Cited

U.S. PATENT DOCUMENTS

| | | | | |
|---|---|---|---|---|
| 3,101,781 A * | 8/1963 | Connally, Jr. | ............ | C09K 8/58 166/401 |
| 3,123,136 A * | 3/1964 | Sharp | ............ | C09K 8/58 166/269 |
| 3,303,878 A * | 2/1967 | Connally, Jr. | ............ | C09K 8/58 166/400 |

(Continued)

FOREIGN PATENT DOCUMENTS

WO   WO-2017155524 A1 * 9/2017 ............... C09K 8/02

*Primary Examiner* — Angela M DiTrani Leff
(74) *Attorney, Agent, or Firm* — DUNLAP CODDING, P.C.

(57) ABSTRACT

A method is described for stimulating a subterranean formation penetrated by a wellbore by injecting a pill through the wellbore at an injection pressure below hydraulic fracking pressure. This is accomplished by introduction of a first volume of non-aqueous liquid to the wellbore, followed by introduction of anhydrous liquid ammonia, and this followed by introduction of a second volume of a non-aqueous liquid into the subterranean formation, wherein the anhydrous liquid ammonia is sandwiched between the first volume of non-aqueous liquid and the second volume of non-aqueous liquid, thereby forming the pill. A volume of push-fluid is then introduced to the wellbore to push the pill into the formation and allow the anhydrous ammonia to react with water in the formation to increase the pressure and form microfractures. However, the pill is introduced into the subterranean formation at injection pressure, and substantially below the hydraulic fracking pressure of the formation.

15 Claims, 1 Drawing Sheet

(56) References Cited

U.S. PATENT DOCUMENTS

| | | | |
|---|---|---|---|
| 3,392,782 A * | 7/1968 | Ferrell | C09K 8/584 |
| | | | 166/275 |
| 3,464,492 A * | 9/1969 | Friedman | C09K 8/592 |
| | | | 166/272.3 |
| 3,776,312 A * | 12/1973 | Ban | E21B 43/26 |
| | | | 166/308.1 |
| 3,930,539 A * | 1/1976 | Curtis | E21B 37/00 |
| | | | 166/308.1 |
| 4,250,965 A | 2/1981 | Wiseman, Jr. | |
| 4,522,265 A | 6/1985 | Yen et al. | |
| 5,002,128 A | 3/1991 | Wiseman, Jr. | |
| 5,168,930 A | 12/1992 | Wiseman et al. | |
| 5,458,197 A | 10/1995 | Chan | |
| 5,713,416 A | 2/1998 | Chatterji et al. | |
| 10,689,567 B2 * | 6/2020 | Stanciu | C09K 8/536 |
| 2013/0146288 A1 * | 6/2013 | Smith | E21B 43/26 |
| | | | 166/305.1 |
| 2015/0152318 A1 * | 6/2015 | Travis | E21B 27/02 |
| | | | 166/280.1 |
| 2015/0197685 A1 * | 7/2015 | Southwick | C09K 8/584 |
| | | | 507/224 |

\* cited by examiner

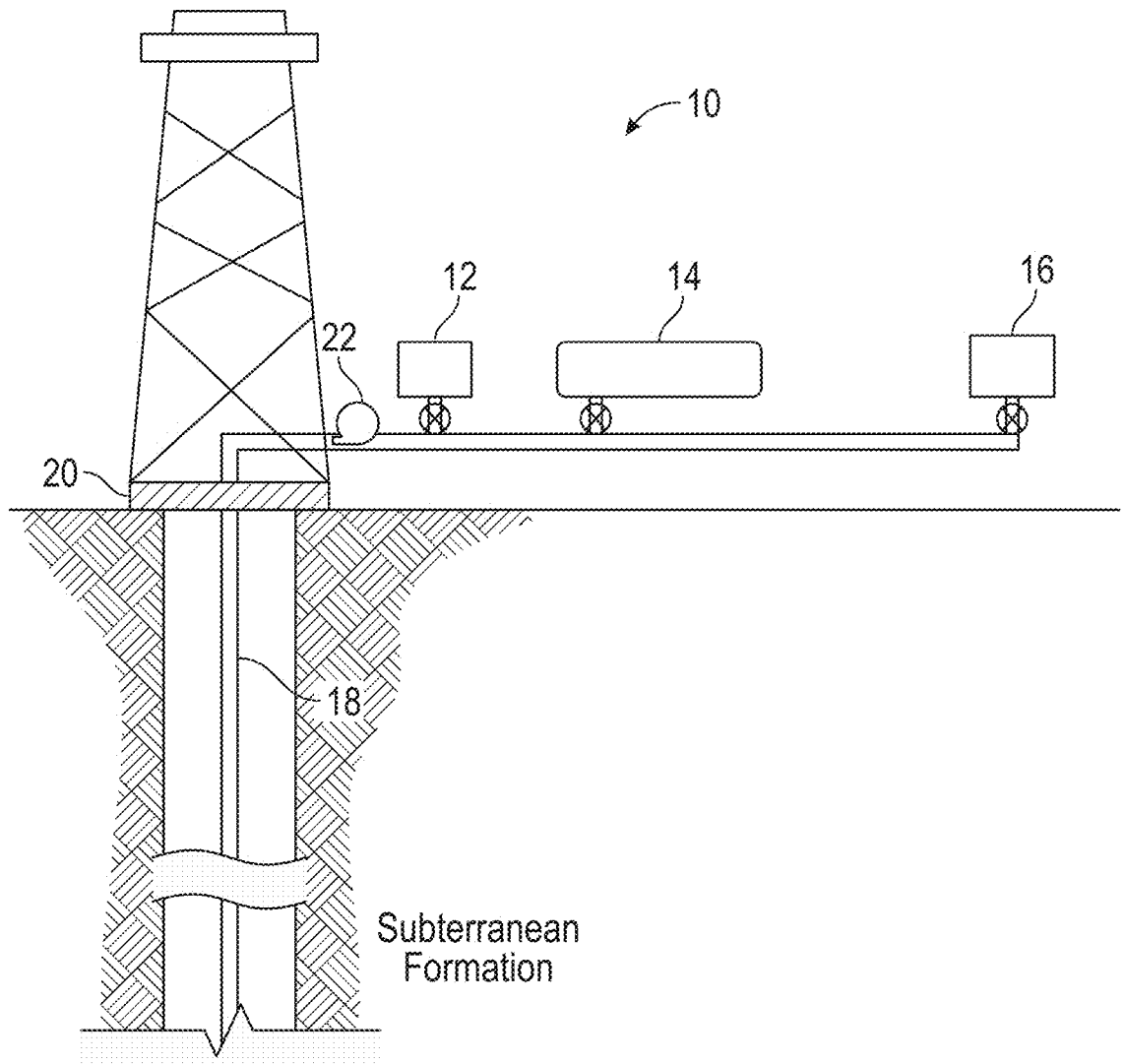

ANHYDROUS AMMONIA STIMULATION PROCESS

INCORPORATION BY REFERENCE STATEMENT

This application claims priority to U.S. Provisional Application 63/370,059 filed Aug. 1, 2022, the entire content of which is hereby expressly incorporated herein by reference.

BACKGROUND

The following disclosure generally relates to subterranean stimulation operations and, more particularly, to methods and compositions for fracturing ("fracking") a well using liquid anhydrous ammonia at low pressure and without proppant and gelling agents.

As explained in US2015/0152318, hydraulic fracturing is a technique of fracturing subsurface rock formations using high-pressure injection of a fluid, usually water mixed with proppants suspended with the aid of thickening agents, in order to extract oil and natural gas contained in the formations. The fracturing fluid is injected into a wellbore under very high pressure to create fractures in the target formations. Water is essentially incompressible; therefore, it is effective at fracturing the rock in the formation. When the pressure is lowered in the wellbore, the sand props the fractures open allowing the oil and gas contained in the formations to more readily flow into the well for extraction. This technique has revolutionized oil and gas development; however, the very high pressures required for pumping the treatment fluid and proppant, both in the well and aboveground, is very costly. The cost of the high-pressure pumps required and the maintenance of these pumps due to the abrasive nature of proppant particles, represent significant costs.

It would be desirable to fracture a subterranean formation using well pressures closer to the formation pressure and without the need for pumping proppant.

SUMMARY OF THE DISCLOSURE

A method is provided for stimulating and micro-fracturing a subterranean formation penetrated by a wellbore by injecting a pill through the wellbore at an injection pressure substantially below the hydraulic fracking pressure. This is accomplished by introduction of a first volume of non-aqueous liquid to the wellbore, followed by introduction of an anhydrous liquid ammonia treatment fluid, and this followed by introduction of a second volume of a non-aqueous liquid into the subterranean formation, wherein the anhydrous liquid ammonia is sandwiched between the first volume of non-aqueous liquid and the second volume of non-aqueous liquid, thereby forming the pill. A volume of push-fluid is then introduced to the wellbore to push the pill into the formation and allow the anhydrous ammonia to react with water in the formation. The pill is introduced into the subterranean formation at injection pressure, and substantially below the hydraulic fracking pressure of the formation.

In one embodiment, the subterranean formation is fractured without injection of proppant. In another embodiment, no proppant or related viscosity modifiers to hold proppant, such as crosslinking agents and gelling agents, are introduced into the subterranean formation.

BRIEF DESCRIPTION OF THE DRAWINGS

The accompanying FIGURE, which is incorporated in and constitutes a part of this specification, illustrates one or more implementations described herein and, together with the description, explain these implementations. The FIGURE is not intended to be drawn to scale, and certain features and certain views of the FIGURE may be shown exaggerated, to scale or in schematic in the interest of clarity and conciseness. Not every component may be labeled in the FIGURE. Like reference numerals in the FIGURE may represent and refer to the same or similar element or function. In the FIGURE:

The FIGURE shows an exemplary system configured to deliver fluids for stimulating and micro-fracturing a subterranean formation as presently disclosed and claimed.

DETAILED DESCRIPTION

Before explaining at least one embodiment of the presently disclosed methods and processes in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "lithium battery elements" includes a plurality or mixture of lithium, cobalt, nickel, plastics, materials and so forth.

Unless otherwise indicated, all numbers expressing quantities of size (e.g., length, width, diameter, thickness), volume, mass, force, strain, stress, time, temperature or other conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub combinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

The term "injection pressure" is used herein to refer to the pressure required to inject an inert fluid into a formation matrix without causing a breakdown or fracture of the formation.

The term "hydraulic fracturing pressure" or "fracking pressure" is used herein to refer to the pressure necessary to inject an inert fluid to create new fissures, cracks or fractures in the surrounding formation.

Unless otherwise specified, all percentages are based on weight.

Turning now to the present disclosure, certain embodiments thereof describe a method or procedure for stimulating and microfracturing (or "fracking") a targeted subterranean formation penetrated by a well bore through the use of anhydrous liquid ammonia sandwiched between two non-aqueous liquid volumes. The fluids are pumped downhole at a pressure required to achieve injection (injection pressure), rather than the high pressure or hydraulic fracking pressure required for conventional fracturing ("fracking") of the formation. The anhydrous liquid ammonia reacts violently with water within the formation, expanding up to about 750 times its original volume. This rapid expansion increases downhole pressure within the formation to create microfractures, thereby releasing in situ and trapped hydrocarbon fluids such as oil, condensate, and natural gas that would otherwise be unavailable.

In one embodiment, the quantity of the first volume of non-aqueous liquid is in a range between about 1 and 100 barrels. For example, the quantity of the first volume of non-aqueous liquid can be in a range between about 1 and 50 barrels, or between 5 and 50 barrels.

The non-aqueous liquid volumes discourage the anhydrous ammonia from prematurely contacting water until after it is delivered to the formation. It is theoretically possible to perform the process using first and second volumes of water. In fact, the process was successfully tested with skim from a water tank containing about 50% water. However, the ammonia contacting this water is no longer available for use in the formation. Thus, it is preferable to use a non-aqueous liquid.

The term "non-aqueous" as used herein does not mean that there must be zero dissolved or entrained water. Rather, "non-aqueous" means that the main carrier fluid is not water. Non-limiting examples of the first volume of non-aqueous liquid include crude oil, produced oils, and the like. The first volume of non-aqueous liquid can be the same as or different from the second volume of non-aqueous liquid. In one embodiment, the first and second volumes of non-aqueous liquid comprise produced crude oil with a water content of less than 10% or less than 5%.

The non-aqueous liquid is added to tubing for introduction to the subterranean formation through the wellbore. Once the desired first volume of non-aqueous liquid is added to tubing, the treatment fluid comprising anhydrous liquid ammonia is run through the tubing for delivery to the subterranean formation. The liquid anhydrous ammonia does not contain significant amounts of water. In one embodiment, the liquid anhydrous ammonia contains less than 1% water.

In one embodiment, the treatment fluid comprises greater than 90% anhydrous liquid ammonia. In another embodiment, the treatment fluid comprises greater than 98% anhydrous ammonia.

Anhydrous liquid ammonia is typically stored in vessels under a pressure of 114 psig at atmospheric temperature, or fully refrigerated at −28° F. and atmospheric pressure. Liquid ammonia has a boiling point of −28° F., a freezing point of −107° F., and a critical temperature of 270° F. above which it remains as a gas or supercritical fluid above 111 atm.

The anhydrous liquid ammonia does not need any certain rate of barrels/minute to properly create a reaction like seen in hydraulic fracking. Instead, this "stim" creates microfractures in reservoirs to release oil and gas reserves that are otherwise unattainable. As previously described, the liquid ammonia reacts with water present in the reservoir and rapidly expands to increases downhole pressure into the reservoir and create the microfractures.

While the rate of addition is not critical, the volume of anhydrous liquid ammonia is determined by the depth of the target zone, which is estimated from the footage of wellbore perforation. (A perforation is a hole punched in the casing or liner of an oil well to connect it to the reservoir, creating a channel between the pay zone and the wellbore to cause oil and gas to flow to the wellbore easily.) It has been found that anhydrous liquid ammonia should be added in a quantity between 100 and 300 lbs per foot of target zone (100-300 lbs/ft of perforation). In production well tests, less than 100 lbs/ft did not provide sufficient microfracturing, while greater than 300 lbs/ft removed the reservoir water and actually reduced the oil recovery after treatment.

The anhydrous liquid ammonia is sandwiched between the first volume of non-aqueous liquid and the second volume of non-aqueous liquid, thereby forming a pill. The pill is pushed out into the well bore and into the formation using a push fluid. In one embodiment, the push fluid comprises water. Push fluid water clears the tubing and pushes the anhydrous liquid ammonia into the formation before significant amounts are reacted with water.

It was found that a minimum of 60 bbl of a push-fluid such as water are needed. Greater than 200 bbl of water can be used but are not necessary. The push-fluid is pumped quickly to get the anhydrous liquid ammonia into the formation where reaction with water will create pressures great enough to fracture or at least microfracture the formation. However, the fluids are not pumped at rates or pressures that would alone cause hydraulic fracture. Considerable savings in pumping costs are realized by using these lower pressures.

In one embodiment, there is no proppant added to the treatment fluid, to the non-aqueous liquid volumes, or to the push fluid. Because the present treatment causes microfractures rather than the larger fractures caused by hydraulic fracking, proppant is not needed. Because proppant is not necessary, no crosslinking agents, gelling agents, or other viscosity modifiers designed to carry proppant need be added to these fluids. Considerable material costs and pump maintenance costs are avoided by eliminating the proppant and associated carrier chemicals.

In one embodiment, and as shown in the FIGURE, an example well stimulation system 10 includes a non-aqueous fluid storage tank 12, an anhydrous ammonia storage tank 14, and a push fluid storage tank 16. The fluids are delivered into a subterranean formation through a tubular 18 in fluid connection with the wellhead 20 and the subterranean formation. A low-pressure pump 22 delivers the fluids to the subterranean formation at injection pressure, typically in a range of from about 500 psi to about 4500 psi. As described above, a first volume of non-aqueous liquid is pumped from the non-aqueous fluid storage tank 12 to the wellbore through the tubular 18. This is followed by introduction of anhydrous liquid ammonia from storage tank 14, and this followed by introduction of a second volume of a non-aqueous liquid from storage tank 12 (or another not shown), wherein the anhydrous liquid ammonia is sandwiched between the first volume of non-aqueous liquid and the second volume of non-aqueous liquid, thereby forming the pill. A volume of push-fluid is then introduced to the wellbore from push fluid storage tank 16 to push the pill into the formation and allow the anhydrous ammonia to react with water in the formation to form microfractures. The pill is introduced into the subterranean formation at injection pressure, and substantially below the hydraulic fracking pressure of the formation.

Examples

The following procedure was used to successfully stimulate a number of producing wells:

Pull rods with workover rig.

Pull tubing with rig and lay out in preparation to hydrotest tubing for leaks and structural integrity. The tubing should be hydrotested to 5000 PSI. All joints of tubing that meet this qualification will be used in the stim.

After hydrotesting has finished, study drillers logs to identify where the perforations are.

Then, identify the exact footage of wellbore perforation identified in logs to determine the tonnage of anhydrous ammonia required. The liquid anhydrous ammonia can be added in an amount between 100 lbs/ft to 300 lbs/ft of wellbore perforation.

Once the total weight of ammonia is determined, install a service packer that once set can withstand up to 10,000 psi. This packer isolates the casing above it to allow no pressure to escape the wellbore. The packer should be ideally set within 50 feet of the perforations vertically. For example, if the perforations are at 1000 ft. vertically, the packer's ideal set spot will be anywhere from 950 to 980 ft. We do not do the well stimulation "stim" if the packer is in the perforations. This depth tally can be determined by, for example, hand measuring every joint and then adding them up to find total packer depth.

After the packer has been set, the wellhead is "packed off." In other words, this means to close the casing off from the atmosphere using wellhead slips, rubber packing, and a large cast iron cap that screws onto the wellhead. The well is now successfully prepped and ready for the stimulation.

A crew using a trailer mounted triplex, or any pump larger than a triplex (to cover for sudden increase in downhole pressure), can use steel lines to tie directly into the tubing that is in the wellhead. After tying into the tubing, the anhydrous tanker, or small tank will connect a line directly into, for example, an acid truck's pump system. This uses a changeover nipple known as an Acme/2in 8 rd. Finally, a water tank, water truck, or water carrying vessel will also tie into the pump truck. These are all the connections that will need to be made.

Prior to tying into the well, the pump truck crew will pull oil out of a stock tank, or they already have it loaded on the trailer in their vats. Now, the stim begins.

The pump truck will begin pumping 10 bbl of oil. After they have finished the oil, the truck will change its intake valve into pumping liquid NH3. This total will come from the lbs/ft identified above. This process will take as long as needed until the anhydrous ammonia is successfully emptied from its transport into the tubing. Since water reacts with NH3, we will run another 10 bbl of oil down the tubing to create a pill that will push out into the wellbore. Water on the back end of the stimulation is designed to clear the tubing and push the NH3 into the formation before it completely spends its reaction with water. A minimum of 60 bbl of water will be pumped.

The pump operator is notified from the beginning that the pressure is not to exceed 4500 psi. If a well has had previous issues with scale, we will mix a scale inhibitor with the water. If the well has paraffin issues, we will induce a paraffin inhibitor into the water.

The anhydrous ammonia does not need any certain rate of barrels/minute to properly create a reaction like seen in hydraulic fracking. Instead, this process creates microfractures in reservoirs to release oil and gas reserves that are otherwise unattainable. Liquid ammonia can expand up to 768 times when reacting with water. This rapid expansion increases downhole pressure into the reservoir to create the microfractures.

After all trucks have removed tie-ins, the well will either be flowing back, stagnant or on a vacuum. At this point, let the fluid flow into the tank battery as operations were normal day to day. If the well is stagnant or on vacuum, unset the packer and pull it out of the hole for removal, set the tubing back in operator's desired level, run rods, and return to normal production practices.

Using the above procedure, 14 tons of anhydrous ammonia were introduced into well #1. The pump pressure used was about 1500 psi on the surface before going on vacuum. This well had over 140 feet of perforations and had been producing 2 bbls of oil per day prior to treatment. Once back in production after the anhydrous ammonia treatment, well #1 averaged 14 bbl oil per day.

Again, using the above procedure, 12 tons of anhydrous ammonia were introduced into well #2. The pump pressure used was about 1500 psi on the surface before going on vacuum. This well had 110 feet of perforations and had been producing 2.5 bbls of oil per day prior to treatment. Once back in production after the anhydrous ammonia treatment, well #2 made 50 bbl oil the first day, leveled at 15 bbl oil per day for 2 months, after which it averaged 6.7 bbl oil per day.

Again, using the above procedure, 15 tons of anhydrous ammonia was introduced into well #3. The pump pressure used was about 1500 psi on the surface before going on vacuum. This well had 10 feet of perforations and had been producing 1 bbl of oil per day prior to treatment. This was the "overkill" well. Once back in production after the anhydrous ammonia treatment, well #3 flushed 150 bbls of oil in 8 days, and then went down to about 0.5 bbl oil per day.

Although the presently described inventive concepts have been described in considerable detail with reference to certain embodiments thereof, other embodiments are possible without departing from the presently described inventive concepts. The spirit and scope of the claims present in a nonprovisional application based on the present provisional application should not be limited, therefore, to the description of the preferred embodiments contained herein. All embodiments that come within the meaning of the claims, either literally or by equivalence, are intended to be embraced therein.

Thus, in accordance with the present disclosure, there has been provided methods for fracking a subterranean formation using well and pump pressures below fracture pressure and closer to the formation pressure and without the need for pumping proppant. Although the present disclosure has used specific language and examples, it is evident that many alternatives, modifications, and variations will be apparent to those skilled in the art. Accordingly, it is intended to embrace all such alternatives, modifications, and variations that fall within the spirit and broad scope of the present disclosure. Changes may be made in the construction and the operation of the various components, elements, and assemblies described herein, as well as in the steps or the sequence of steps of the methods described herein, without departing from the spirit and scope of the present disclosure. Furthermore, the advantages described above are not necessarily the only advantages of the presently described methods, and it is not necessarily expected that all of the described advantages will be achieved with every embodiment of the presently described methods.

What is claimed is:

1. A method for stimulating a subterranean formation, comprising:
    introducing a first volume of a non-aqueous liquid into the subterranean formation penetrated by a wellbore;
    introducing a treatment fluid comprising anhydrous liquid ammonia into the subterranean formation;
    introducing a second volume of a non-aqueous liquid into the subterranean formation, wherein the anhydrous liquid ammonia is sandwiched between the first volume of non-aqueous liquid and the second volume of non-aqueous liquid, thereby forming a pill; and
    introducing a volume of push-fluid to push the pill into the subterranean formation and allow the anhydrous liquid ammonia to react with water in the subterranean formation to increase pressure and form microfractures, wherein the first and second volumes of non-aqueous liquid, the treatment fluid, and the push-fluid are introduced into the subterranean formation at an injection pressure and substantially below hydraulic fracturing pressure.

2. The method of claim 1, wherein the the first volume of non-aqueous liquid is in a range between about 1 to 50 barrels.

3. The method of claim 2, wherein the second volume of non-aqueous liquid is in a range between about 1 to 50 barrels.

4. The method of claim 1, wherein the first and second volumes of non-aqueous liquid comprise crude oil.

5. The method of claim 1, wherein the first and second volumes of non-aqueous liquid consist essentially of crude oil containing less than about 5 wt % water.

6. The method of claim 1, wherein the treatment fluid comprises less than 1 wt % water.

7. The method of claim 1, wherein the treatment fluid comprises greater than 90% l-quid anhydrous ammonia.

8. The method of claim 1, wherein the treatment fluid comprises greater than 98% l-quid anhydrous ammonia.

9. The method of claim 1, wherein the pill is introduced into the subterranean formation using a pump pressure in a range of from about 500 psi to about 4500 psi.

10. The method of claim 1, wherein the pill contains essentially no proppant.

11. The method of claim 1, wherein the pill contains essentially no crosslinking or gelling agents.

12. The method of claim 1, wherein essentially no proppant, crosslinking agents, or gelling agents are introduced into the subterranean formation.

13. The method of claim 1, wherein a casing is within the wellbore, the casing having wellbore perforations through the casing to provide a flow path between a reservoir within the subterranean formation and the wellbore, the wellbore perforations extending vertically along a length of the casing and an amount of anhydrous liquid ammonia is determined by the length of the casing containing the wellbore perforations.

14. The method of claim 13, wherein the anhydrous liquid ammonia is introduced in an amount between about 100 lb to 300 lb per foot of the length of the casing containing the wellbore perforations.

15. The method of claim 1, wherein the push fluid is pumped into the subterranean formation using a pump pressure in a range of from about 500 psi to about 4500 psi.

* * * * *

UNITED STATES PATENT AND TRADEMARK OFFICE
CERTIFICATE OF CORRECTION

PATENT NO. : 11,959,019 B2
APPLICATION NO. : 18/330873
DATED : April 16, 2024
INVENTOR(S) : Holden Cook, Ron Hammond and Brent Cook Page 1 of 1

It is certified that error appears in the above-identified patent and that said Letters Patent is hereby corrected as shown below:

In the Claims

Column 8, Line 15: After "wherein" delete "the"

Column 8, Line 29: After "90%" delete "1-quid anhydrous" and replace with --anhydrous liquid--

Column 8, Line 31: After "98%" delete "1-quid anhydrous" and replace with --anhydrous liquid--

Signed and Sealed this
Twenty-eighth Day of May, 2024

*Katherine Kelly Vidal*

Katherine Kelly Vidal
*Director of the United States Patent and Trademark Office*